United States Patent [19]
Hashimura

[11] Patent Number: 5,978,154
[45] Date of Patent: Nov. 2, 1999

[54] ZOOM LENS SYSTEM

[75] Inventor: Junji Hashimura, Sakai, Japan

[73] Assignee: Minolta Co., Ltd., Osaka, Japan

[21] Appl. No.: 08/874,921

[22] Filed: Jun. 13, 1997

[30]  Foreign Application Priority Data

Jun. 14, 1996 [JP] Japan .................................. 8-153928

[51] Int. Cl.$^6$ ................................................ G02B 15/14
[52] U.S. Cl. ........................................................ 359/691
[58] Field of Search .................................. 359/652–654, 359/691, 690, 689, 686

[56]  References Cited

U.S. PATENT DOCUMENTS

| | | | |
|---|---|---|---|
| 4,976,521 | 12/1990 | Ishii et al. | 350/423 |
| 4,998,807 | 3/1991 | Uzawa et al. | 350/426 |
| 5,046,833 | 9/1991 | Tsuchida | 359/654 |
| 5,184,251 | 2/1993 | Tsuchida et al. | 359/654 |
| 5,313,328 | 5/1994 | Aoki | 359/654 |
| 5,321,552 | 6/1994 | Horiuchi et al. | 359/654 |
| 5,541,775 | 7/1996 | Kiriki | 359/654 |

FOREIGN PATENT DOCUMENTS 4-63312  2/1992  Japan .

*Primary Examiner*—Hung Xuan Dang
*Assistant Examiner*—Michael A Lucas
*Attorney, Agent, or Firm*—Sidley & Austin

[57]  ABSTRACT

The object of the present invention is to provide a high-performance zoom lens system that having a small number of lens elements and can also be used for wide-angle purpose. In order to achieve the object, said zoom lens system has, from the object side, a first lens unit having positive refractive power and a second lens unit having negative refractive power, wherein said zoom lens system varies magnification by changing a distance between at least said first and second lens unit, wherein at least one of said lens units includes a gradient index lens, said gradient index lens having at least one aspherical surface.

35 Claims, 6 Drawing Sheets

FNO=4.10

SPHERICAL ABERRATION
SINE CONDITION

Y'=21.6

ASTIGMATISM

Y'=21.6

DISTORTION %

FNO=5.10

SPHERICAL ABERRATION
SINE CONDITION

Y'=21.6

ASTIGMATISM

Y'=21.6

DISTORTION %

FNO=5.80

SPHERICAL ABERRATION
SINE CONDITION

Y'=21.6

ASTIGMATISM

Y'=21.6

DISTORTION %

FNO=4.10

SPHERICAL ABERRATION
SINE CONDITION

Y'=21.6

ASTIGMATISM

Y'=21.6

DISTORTION %

FNO=5.10

SPHERICAL ABERRATION
SINE CONDITION

Y'=21.6

ASTIGMATISM

Y'=21.6

DISTORTION %

FNO=5.80

SPHERICAL ABERRATION
SINE CONDITION

Y'=21.6

ASTIGMATISM

Y'=21.6

DISTORTION %

FNO=4.10

SPHERICAL ABERRATION
SINE CONDITION

Y'=21.6

ASTIGMATISM

Y'=21.6

DISTORTION %

FNO=5.10

SPHERICAL ABERRATION
SINE CONDITION

Y'=21.6

ASTIGMATISM

Y'=21.6

DISTORTION %

FNO=5.80

SPHERICAL ABERRATION
SINE CONDITION

Y'=21.6

ASTIGMATISM

Y'=21.6

DISTORTION %

FIG.14A
FNO=4.10
FIG.14B
Y'=21.6
FIG.14C
Y'=21.6
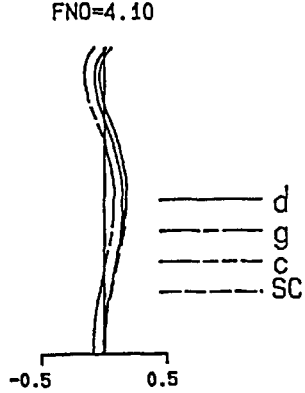
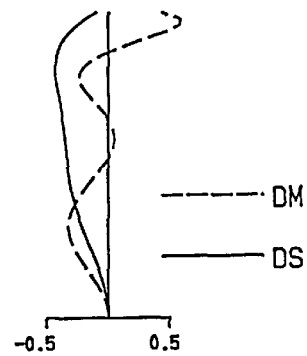
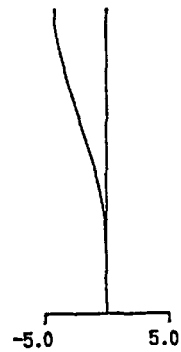
SPHERICAL ABERRATION
SINE CONDITION
ASTIGMATISM
DISTORTION %
FIG.15A
FNO=5.10
FIG.15B
Y'=21.6
FIG.15C
Y'=21.6
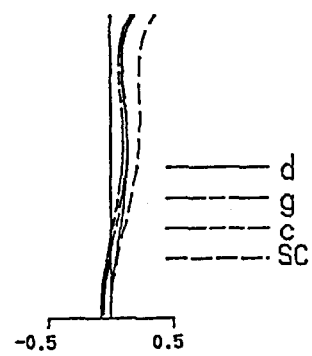
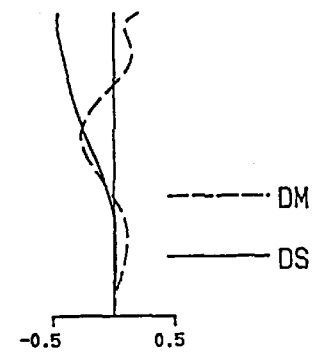
SPHERICAL ABERRATION
SINE CONDITION
ASTIGMATISM
DISTORTION %
FIG.16A
FNO=5.80
FIG.16B
Y'=21.6
FIG.16C
Y'=21.6
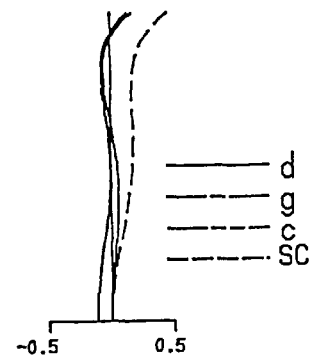
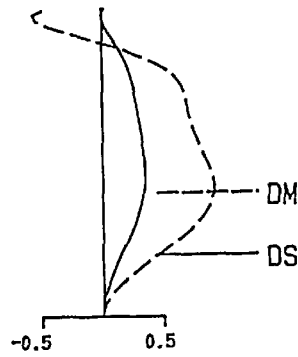
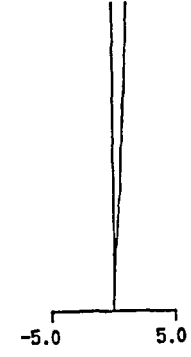
SPHERICAL ABERRATION
SINE CONDITION
ASTIGMATISM
DISTORTION %

ZOOM LENS SYSTEM

BACKGROUND OF THE INVENTION

1. Field of the Invention

The present invention pertains to a zoom lens system, and more particularly to a zoom lens system capable of covering all ranges including the wide-angle range and appropriate for a still camera, video camera, etc.

2. Description of the Prior Art

Conventionally, in a zoom lens system used in a still camera or video camera, it has been desired to increase the aperture ratio and magnification while reducing the number of lens elements in the entire system in order to make the camera less costly and more compact. In response to this need, a technology has been proposed that reduces the number of lens elements in the entire zoom lens system by employing a gradient index lens (GRIN lens) while performing aberration correction.

For example, Japanese Laid-Open Patent Application 2-79013 discloses an example of a zoom lens system comprising, from the object side, a first lens unit having a negative refractive power and a second lens unit having a positive refractive power, wherein a GRIN lens is used in the second lens unit and both the first and second lens units comprise two lens elements.

Japanese Laid-Open Patent Application 2-56515 discloses an example of a zoom lens system comprising, from the object side, a first lens unit having a negative refractive power and a second lens unit having a positive refractive power, wherein a GRIN lens is used in both the first and second lens units, each of which comprises a single lens element.

Japanese Laid-Open Patent Application 2-124509 also discloses an example of a zoom lens system comprising, from the object side, a first lens unit having a negative refractive power and a second lens unit having a positive refractive power, wherein a GRIN lens is used in both the first and second lens units, each of which comprises a single lens element.

However, because the GRIN lens in the zoom lens system disclosed in Japanese Laid-Open Patent Application 2-79013 has spherical surfaces, there is insufficient freedom to perform aberration correction and each lens unit must comprise more than one lens element, and therefore the problem arises that the number of lens elements cannot be reduced any further.

With regard to Japanese Laid-Open Patent Applications 2-56515 and 2-124509, because the GRIN lens used in the zoom lens systems disclosed in said applications has spherical or flat surfaces, the problems arise that the total length of the entire lens system is large and that the lens system cannot be used for wide-angle purposes.

OBJECT AND SUMMARY

The object of the present invention is to provide a high-performance zoom lens system that comprises a small number of lens elements and can also be used for wide-angle purposes.

In order to achieve said object, the zoom lens system of the present invention comprises multiple lens units including, from the object side, a first lens unit having a negative refractive power and a second lens unit having a positive refractive power, wherein said zoom lens system varies magnification by changing the distance between at least the first and second lens units, and at least one of said lens units includes a gradient index lens expressed by means of the following equation, said gradient index lens having at least one aspherical surface.

$$N(H) = N_0 + N_1 \cdot H^2 + N_2 \cdot H^4 + N_3 \cdot H^6 \ldots$$

where,
H: height in the direction perpendicular to the optical axis;
$N_0$: refractive index along the optical axis; and
$N_i$(i=1, 2, 3 . . . ): 2ith refractive index distribution coefficient.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

FIGS. 14A through 14C show aberrations pertaining to the fourth embodiment in the shortest focal length condition.

FIGS. 15A through 15C show aberrations pertaining to the fourth embodiment in the middle focal length condition.

FIGS. 16A through 16C show aberrations pertaining to the fourth embodiment in the longest focal length condition.

DESCRIPTION OF THE PREFERRED EMBODIMENTS

The zoom lens system in which the present invention is applied will be explained below with reference to the drawings. FIGS. 1 through 4 respectively show the lens construction of the zoom lens systems of the first through fourth embodiments, and show the arrangement of the lens elements in the shortest focal length condition (W). The zoom lens systems of said embodiments are all zoom lens systems for a still camera.

Figure 1:
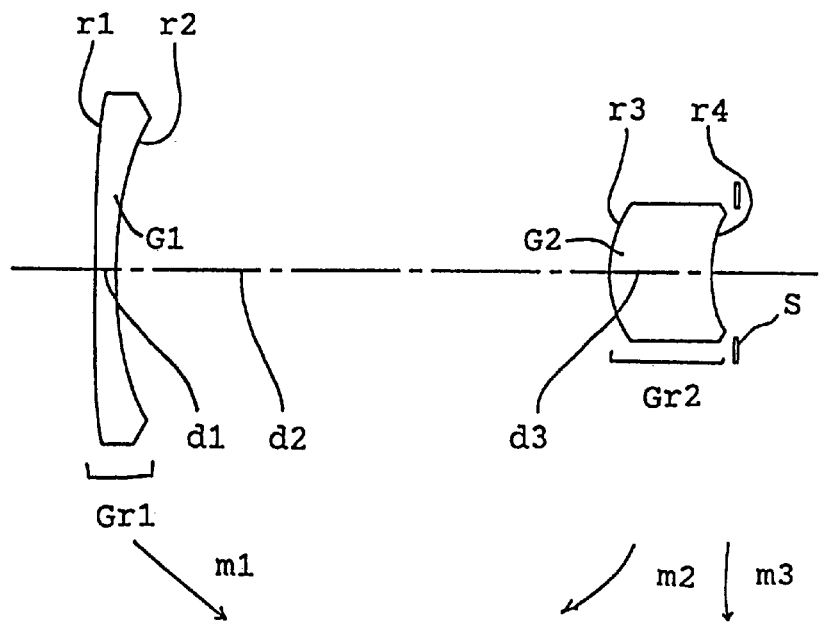
FIG. 1 shows the construction pertaining to a first embodiment of the zoom lens system of the present invention.
Figure 2:
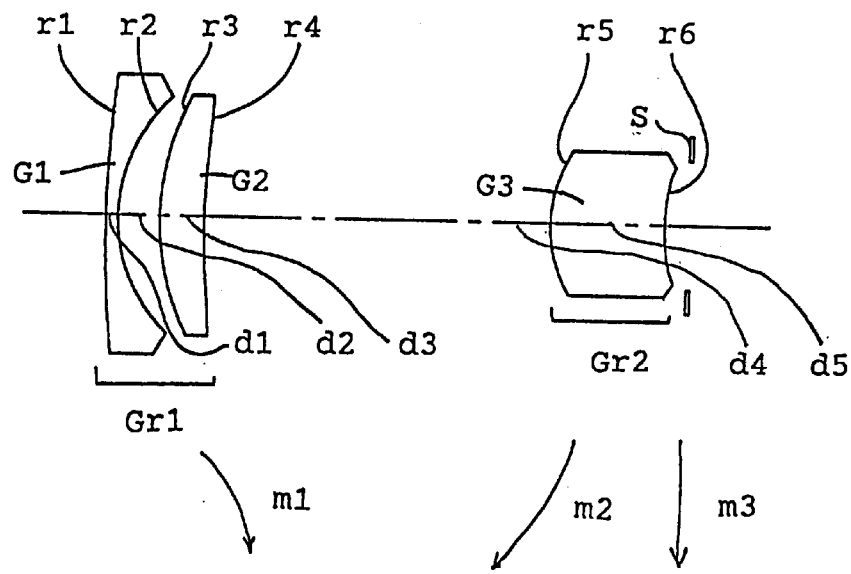
FIG. 2 shows the construction pertaining to a second embodiment of the zoom lens system of the present invention.
Figure 3:
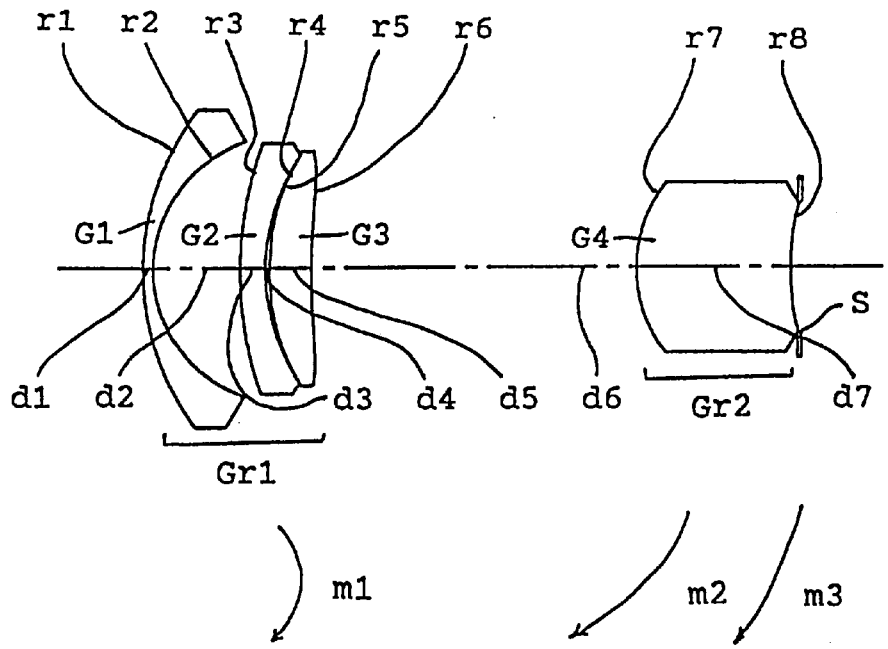
FIG. 3 shows the construction pertaining to a third embodiment of the zoom lens system of the present invention.
Figure 4:
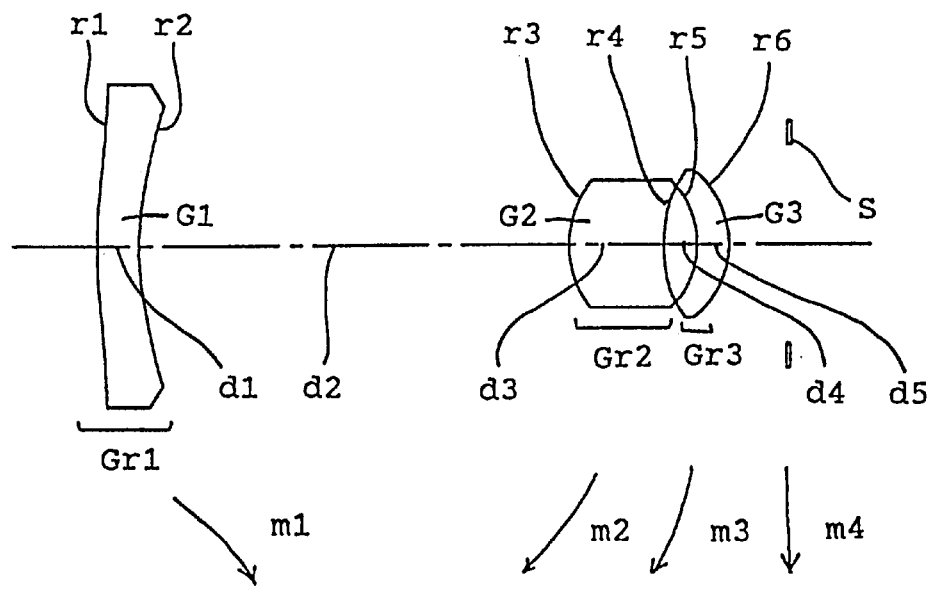
FIG. 4 shows the construction pertaining to a fourth embodiment of the zoom lens system of the present invention.
Figure 5A:
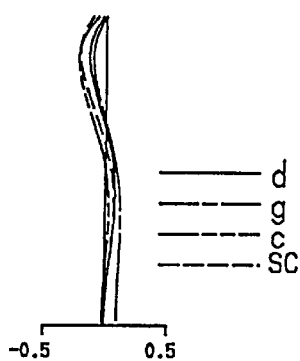
FIGS. 5A through 5C show aberrations pertaining to the first embodiment in the shortest focal length condition.
Figure 5B:
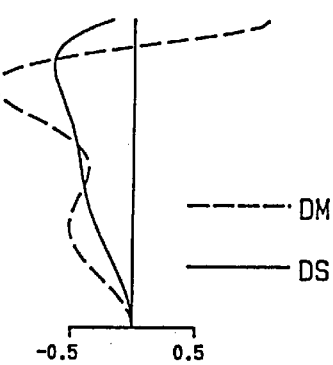
Figure 5C:
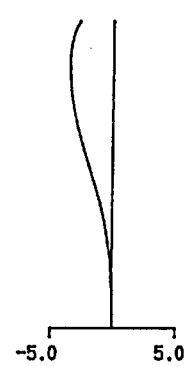
Figure 6A:
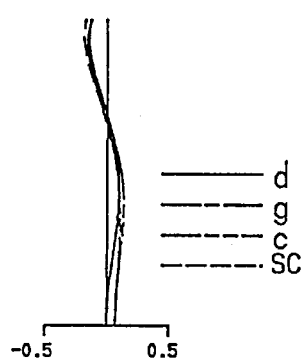
FIGS. 6A through 6C show aberrations pertaining to the first embodiment in the middle focal length condition.
Figure 6B:
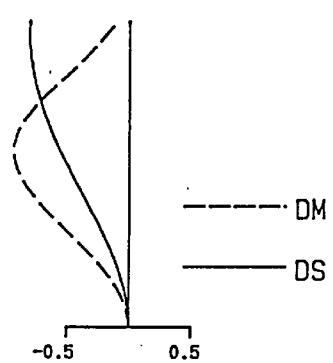
Figure 6C:
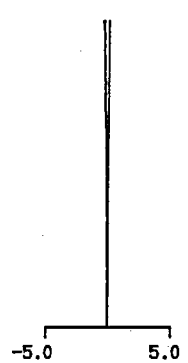
Figure 7A:
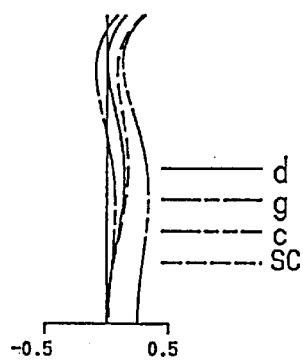
FIGS. 7A through 7C show aberrations pertaining to the first embodiment in the longest focal length condition.
Figure 7B:
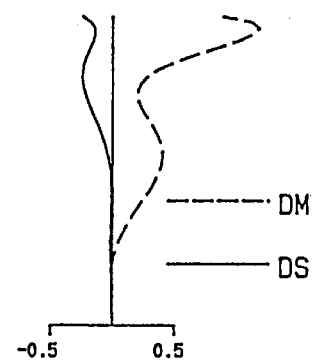
Figure 7C:
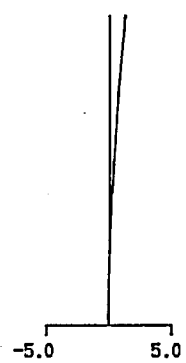
Figure 8A:
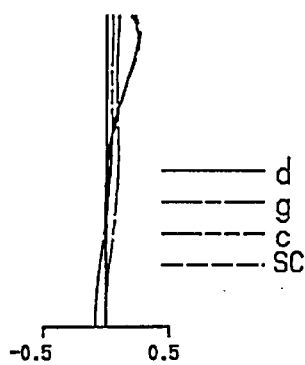
FIGS. 8A through 8C show aberrations pertaining to the second embodiment in the shortest focal length condition.
Figure 8B:
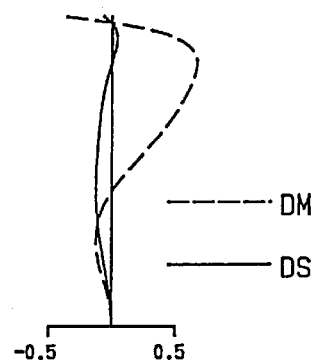
Figure 8C:
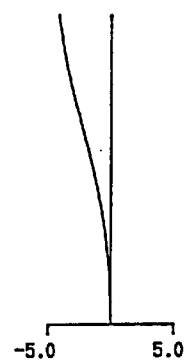
Figure 9A:
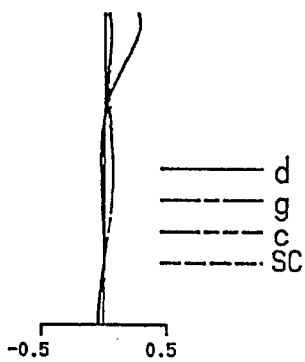
FIGS. 9A through 9C show aberrations pertaining to the second embodiment in the middle focal length condition.
Figure 9B:
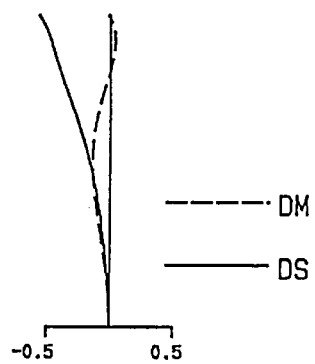
Figure 9C:
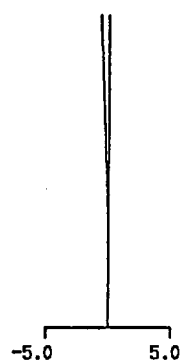
Figure 10A:
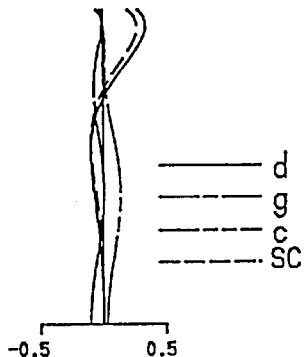
FIGS. 10A through 10C show aberrations pertaining to the second embodiment in the longest focal length condition.
Figure 10B:
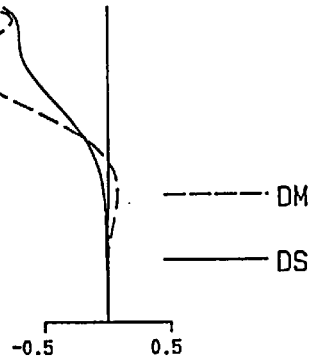
Figure 10C:
Figure 11A:
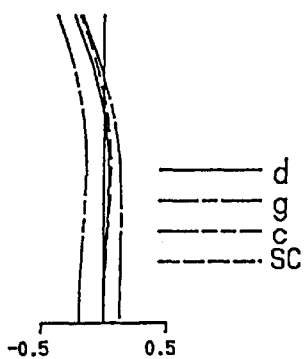
FIGS. 11A through 11C show aberrations pertaining to the third embodiment in the shortest focal length condition.
Figure 11B:
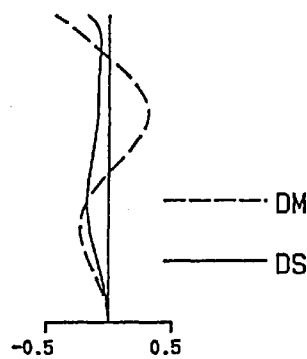
Figure 11C:
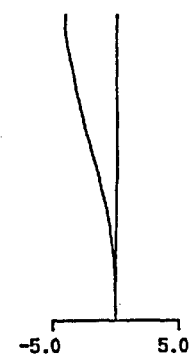
Figure 12A:
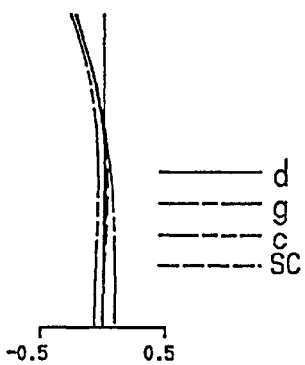
FIGS. 12A through 12C show aberrations pertaining to the third embodiment in the middle focal length condition.
Figure 12B:
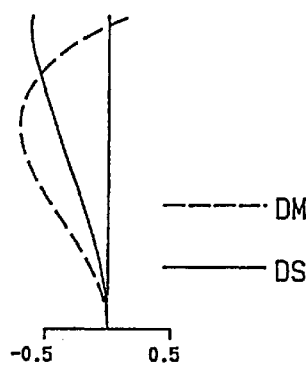
Figure 12C:
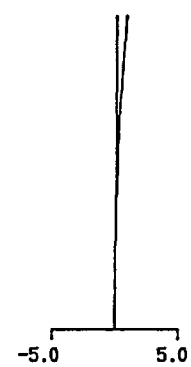
Figure 13A:
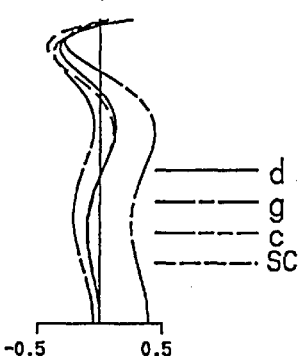
FIGS. 13A through 13C show aberrations pertaining to the third embodiment in the longest focal length condition.
Figure 13B:
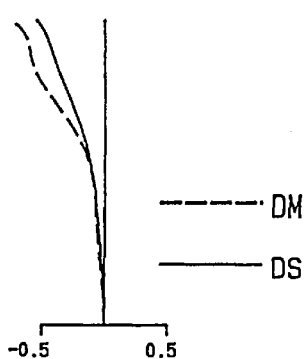
Figure 13C:
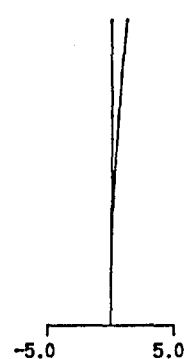

In FIGS. 1 through 3, the zoom lens systems of the first through third embodiments each comprise, from the object side, first lens unit Gr1 having a negative refractive power, second lens unit Gr2 having a positive refractive power, and aperture S. In FIG. 4, the zoom lens system of the fourth embodiment comprises, from the object side, first lens unit Gr1 having a negative refractive power, second lens unit Gr2 having a positive refractive power, third lens unit Gr3 having a positive refractive power, and aperture S.

In the first embodiment shown in FIG. 1, first lens unit Gr1 comprises first lens element G1 that consists of a single GRIN lens having a negative meniscus configuration with the convex surface on the object side and aspherical surfaces on boththe object and image sides. Second lens unit Gr2 comprises second lens element G2 that consists of a single GRIN lens having a positive meniscus configuration with the convex surface on the object side and aspherical surfaces on both the object and image sides. In FIG. 1, arrows m1 through m3 indicate in a simplified fashion the movements of the lens units and the aperture during zooming from the shortest focal length position to the longest focal length position.

In the second embodiment shown in FIG. 2, first lens unit Gr1 comprises, from the object side, first lens element G1 having a negative meniscus configuration with the convex surface on the object side and second lens element G2 having a positive meniscus configuration with the convex surface on the object side and an aspherical surface on the image side. Both first lens element G1 and second lens element G2 are homogeneous lenses. Second lens unit Gr2 comprises third lens element G3 having a positive meniscus configuration with the convex surface on the object side and aspherical surfaces on both the object and image sides. In FIG. 2, arrows m1 through m3 indicate in a simplified fashion the movements of the lens units and the aperture during zooming from the shortest focal length position to the longest focal length position.

In the third embodiment shown in FIG. 3, first lens unit Gr1 comprises, from the object side, first lens element G1 having a negative meniscus configuration with the convex surface on the object side, second lens element G2 having a negative meniscus configuration with the convex surface on the object side, and third lens element G3 having a positive meniscus configuration with the convex surface on the object side. All of the lens elements G1 through G3 are homogeneous lenses. Second lens unit Gr2 comprises fourth lens element G4 that consists of a single GRIN lens having a positive meniscus configuration with the convex surface on the object side and aspherical surfaces on boththe object and image sides. In FIG. 3, arrows m1 through m3 indicate in a simplified fashion the movements of the lens units and the aperture during zooming from the shortest focal length position to the longest focal length position.

In the fourth embodiment shown in FIG. 4, first lens unit Gr1 comprises first lens element G1 that consists of a single GRIN lens having a negative meniscus configuration with the convex surface on the object side and aspherical surfaces on both the object and image sides. Second lens unit Gr2 comprises second lens element G2 that consists of a single GRIN lens having a positive meniscus configuration with the convex surface on the object side and aspherical surfaces on both the object and image sides. Third lens unit Gr3 comprises third lens element G3 that consists of a single biconvex lens having a strongly curved convex surface on the object side and aspherical surfaces on both the object and image sides. Third lens element G3 is a homogeneous lens. In FIG. 4, arrows m1 through m4 indicate in a simplified fashion the movements of the lens units and the aperture during zooming from the shortest focal length position to the longest focal length position.

The GRIN lens used in the first through fourth embodiments has the refractive index distribution defined by the following equation.

$$N(H)=N_0+N_1 \cdot H^2+N_2 \cdot H^4+N_3 \cdot H^6 \ldots \quad (1)$$

where,

H: height in the direction perpendicular to the optical axis;

$N_0$: refractive index along the optical axis; and $N_i$ (i=1, 2, 3 . . . ): 2ith refractive index distribution coefficient.

Equation (1) expresses the fact that the GRIN lens used in the zoom lens system of each embodiment is the type of GRIN lens in which the refractive index varies in the direction perpendicular to the optical axis (radial-type GRIN lens). In the explanation below, the term 'GRIN lens' will refer to a radial-type GRIN lens.

Conventionally, where a single focal point lens system is constructed using a spherical or flat GRIN lens, sufficient freedom in design may not be obtained for tertiary aberration correction, and therefore it is believed to be not possible for an optical system to comprise a single GRIN lens. (See, e.g., "Design of a Gradient-index Photographic Objective", Appl. Opt., Vol. 21, 1982, pp. 993–998.) The same thing may be said regarding a zoom lens system: Where it is desired to have the lens units comprising a zoom lens system each comprise a single GRIN lens, aberration correction would be impossible due to the insufficient freedom in design for correction of tertiary aberration, and it is accordingly not possible for each of the lens units to comprise a single GRIN lens.

On the other hand, where the lens units comprising a zoom lens system comprise only aspherical or spherical homogeneous lenses, because chromatic aberration correction or Petzval sum correction cannot be performed even if the aspherical configuration is varied, it is not possible for the lens units to comprise a single lens. Therefore, to perform correction of these aberrations, each lens unit must comprise at least two lens elements (one positive lens element and one negative lens element).

In the zoom lens systems of the embodiments, however, a GRIN lens is used in the lens units, and at least one surface of this GRIN lens is made aspherical. The result of this construction is that the design freedom to perform aberration correction increases and the number of lens elements comprising the zoom lens system may be reduced. Moreover, with this construction, a zoom lens system having a high aperture ratio and high magnification capability may be achieved while each lens unit of the zoom lens system comprises only a single lens. Further, because the thickness of each lens unit may be reduced, the optical system may also be made compact.

Next, the conditions that must be satisfied by the zoom lens systems of the embodiments will be sequentially explained.

It is desirable for the GRIN lens used in the zoom lens systems of the embodiments to satisfy condition (2) set forth below.

$$-5.0 < \text{sgn}(\phi G) \cdot \frac{N_1}{\phi G^2} < 10.0 \qquad (2)$$

where, sgn(φG): parameter whose value becomes +1 when the refractive power of the lens unit including a GRIN lens is negative, and −1 when the refractive power of the lens unit including a GRIN lens is positive;

$N_1$: secondary refractive index distribution coefficient of the GRIN lens; and φG: refractive power of the GRIN lens.

Condition (2) concerns the refractive index distribution of the GRIN lens, and is mainly a condition for performing Petzval sum correction in the lens unit incorporating a GRIN lens. Where this range is exceeded, Petzval sum correction using the GRIN lens becomes difficult and the refractive index distribution becomes large, making manufacturing undesirably difficult.

Conventionally, in a zoom lens system such as the zoom lens system of the embodiments, comprising multiple lens units including, from the object side, a first lens unit having a negative refractive power and a second lens unit having a positive refractive power, wherein said zoom lens system varies magnification by changing the distance between at least the first and second lens units, in order to make the optical system more compact, the positive refractive power of the second lens unit must be made extremely large. Consequently, where the second lens unit comprises only homogeneous spherical lenses, it becomes difficult to correct aberration, particularly spherical aberration, and a large number of lens elements must be used in the second lens unit.

In addition, where the second lens unit comprises only homogeneous lenses, because the aspherical surface lacks sufficient power to perform chromatic aberration correction or Petzval sum correction even where an aspherical surface is employed to carry out aberration correction, it is necessary to include a minimum of one positive lens and one negative lens in the second lens unit. Therefore, a minimum of two lens elements must be used in the second lens unit. As a result, where the second lens unit comprises only homogeneous lenses, it is extremely difficult for said lens unit to consist of only a single lens element.

On the other hand, the number of lens elements in the second lens unit can be reduced by using a GRIN lens in said lens unit. However, because the second lens unit must have an extremely high refractive power, it is extremely difficult to ensure sufficient performance or to reduce the number of lens elements simply by using a spherical or flat GRIN lens. Consequently, the zoom lens systems of the first through fourth embodiments comprise multiple lens units including, from the object side, a first lens unit having a negative refractive power and a second lens unit having a positive refractive power, wherein said zoom lens system varies magnification by changing the distance between at least said first and second lens units, and wherein a GRIN lens expressed by means of equation (1) is used in the second lens unit, said GRIN lens having at least one aspherical surface. As a result, it is possible for the second lens unit to comprise only one lens element.

It is desirable for the GRIN lens used in the second lens unit to satisfy condition (3) set forth below.

$$-10.0 < \frac{N_1 d2}{\phi_2^2} < 5.0 \qquad (3)$$

where, $N_1 d2$: secondary refractive index distribution coefficient of the GRIN lens used in the second lens unit relative to the d-line; and $\phi_2$: refractive power of the second lens unit.

Condition (3) pertains to the refractive index distribution of the GRIN lens used in the second lens unit, and is mainly a condition for performing Petzval sum correction in the second lens unit. If the upper limit of condition (3) is exceeded, the second lens unit Petzval sum increases in the positive direction. If the lower limit of condition (3) is exceeded, Petzval sum correction by the GRIN lens becomes excessive, and the refractive index distribution also becomes large, making manufacturing difficult, which is not desirable.

Where a GRIN lens is used in the first lens unit, it is desirable for said GRIN lens to satisfy conditions (4), (5) and (7) set forth below.

In a range defined by 0<H<0.5H max, $$\frac{d}{dH}\{v_d(H)\} < 0.0 \qquad (4)$$

In a range defined by O<H<H max, $$0.0 < \frac{v_d(H) - v_d(0)}{v_d(0)} \leq 2.0 \qquad (5)$$

where,

H: height in the direction perpendicular to the optical axis;

H max: maximum value for height in the direction perpendicular to the optical axis (effective aperture);

d/dH differential symbol; and $v_d(H)$ dispersion of the GRIN lens at a point that is height H away from the optical axis, in the direction perpendicular to the optical axis, as expressed by means of the following equation:

$$v_d(H) = \frac{N_d(H) - 1}{N_F(H) - N_C(H)} \qquad (6)$$

where, $N_d(H)$: d-line refractive index at height H;
$N_F(H)$: F-line refractive index at height H; and
$N_C(H)$: C-line refractive index at height H.

$$-0.3 < \frac{N_1\lambda 1 - N_1 d1}{\phi 1 G^2} < 0.2 \qquad (7)$$

where, $N_1 d1$: secondary refractive index distribution coefficient of the GRIN lens used in the first lens unit relative to the d-line;

$N_1\lambda 1$: secondary refractive index distribution coefficient of the GRIN lens used in the first lens unit relative to the C-line or the F-line; and, φ1G refractive power of the GRIN lens used in the first lens unit.

Where a GRIN lens is used in the first lens unit, the GRIN lens serves mainly to perform correction of chromatic aberration. Conditions (4), (5) and (7) are conditions governing dispersion and the refractive index distribution coefficients, which must be satisfied by the GRIN lens in the first lens unit. Where the ranges defined by these conditions are exceeded, correction of chromatic aberration in the entire optical system becomes extremely difficult due to the chromatic aberration arising in the first lens unit.

Where a GRIN lens is used in the first lens unit, it is desirable for its refractive index distribution coefficients to satisfy conditions (8) and (9) set forth below.

$$-2.0 < \frac{N_1 d1}{\phi 1 G^2} < 5.0 \tag{8}$$

$$\left| \frac{N_2 d1}{\phi 1 G^4} \right| < 100 \tag{9}$$

where, $N_1 d1$: secondary refractive index distribution coefficient of the GRIN lens used in the first lens unit relative to the d-line;

$N_2 d1$: quaternary refractive index distribution coefficient of the GRIN lens used in the first lens unit relative to the d-line; and, $\phi 1G$: refractive power of the GRIN lens used in the first lens unit.

Conditions (8) and (9) are conditions governing the refractive index distribution coefficients, which must be satisfied by a GRIN lens when it is used in the first lens unit. Where the ranges defined by these conditions are exceeded, the refractive index distribution becomes too large. In particular, spherical aberration and off-axial coma aberration become large in the longest focal length condition and higher order aberrations also arise, which is not desirable.

Where a GRIN lens is used in the first lens unit, it is desirable for said GRIN lens to satisfy condition (10) set forth below.

$$-0.2 < \frac{\phi 1 GM}{\phi 1 GS} < 0.5 \tag{10}$$

where, $\phi 1GS$: refractive power of the surface of the GRIN lens used in the first lens unit; and $\phi 1GM$: refractive power of the medium of the GRIN lens used in the first lens unit.

Here, where the refractive power of the GRIN lens used in the first lens unit is deemed $\phi 1G$, $\phi 1GS$ and $\phi 1GM$ are each expressed by means of the following equation.

$$\phi 1G = \phi 1GM + \phi 1GS$$

$\phi 1GS$ is the refractive power (the refractive index is the refractive index along the optical axis of the lens) where the lens is a homogeneous lens. $\phi 1GM$ is the refractive power that the medium has due to the fact that the lens has a refractive index distribution, and is expressed by means of the following equation.

$$\phi 1GM = -2N_1 d1 \cdot T1G$$

where, $T1G$: core thickness of the GRIN lens used in the first lens unit; and $N_1 d1$: secondary refractive index distribution coefficient of the GRIN lens used in the first lens unit relative to the d-line.

Condition (10) is a condition that must be satisfied by a GRIN lens when it is used in the first lens unit. If the upper limit of condition (10) is exceeded, the refractive index distribution becomes too large, making manufacturing difficult, and higher order aberrations also arise, which is undesirable. If the lower limit of condition (10) is exceeded, the negative refractive power possessed by the refractive index distribution becomes too large, which increases the refractive power of the surface in the positive direction and makes Petzval sum correction difficult. Correction of various types of aberration, particularly higher order aberrations, also becomes difficult, which is not desirable.

Where the first lens unit comprises a single GRIN lens, it is desirable for said lens to comprise either a negative lens with a strongly curved concave surface on the image side or a negative meniscus lens with the convex surface on the object side. Because these configurations allow the spherical aberration and coma aberration occurring in the first lens unit to be reduced, they are particularly desirable from the standpoint of correcting spherical aberration and coma aberration in the longest focal length condition. Moreover, because the rear principal point of the first lens unit comes to be located on the back side of the lens in these configurations, even when the optical system is zoomed to a high magnification, a sufficient distance between the first lens unit and the second lens unit may be ensured in the longest focal length condition, so that the aperture and flare cutter may be located inside the space between said lens units, which is desirable.

Where a GRIN lens is used in the first lens unit, it is desirable for said GRIN lens to satisfy condition (11) set forth below.

$$-5.0 < \frac{R_{12} + R_{11}}{R_{12} - R_{11}} < 0.0 \tag{11}$$

where, $R_{11}$: radius of curvature of the object side surface of the first lens unit; and $R_{12}$: radius of curvature of the image side surface of the first lens unit.

Condition (11) governs the configuration of the GRIN lens where a GRIN lens is used in the first lens unit. If the upper limit of condition (11) is exceeded, spherical aberration particularly in the longest focal length condition tends to tilt toward the negative side in the aberration diagram, which is undesirable. If the lower limit of condition (11) is exceeded, spherical aberration particularly in the longest focal length condition tends to tilt toward the positive side in the aberration diagram, which is also undesirable. If the range defined by condition (11) is exceeded, correction of coma aberration also becomes difficult, which is undesirable.

Where an aspherical surface is employed on one of the lens elements of the first lens unit, it is desirable for said aspherical surface to satisfy condition (12) set forth below.

In a range defined by $0<H<H$ max, $$-6.0 < \frac{\phi_a - \phi_{0a}}{\phi_1} < 5.0 \tag{12}$$

where, $\phi_a$: local refractive power of the aspherical surface;

$\phi_{0a}$: refractive power based on the standard curvature of the aspherical surface; and $\phi_1$: refractive power of the first lens unit, where $\phi_a$ and $\phi_{0a}$ are expressed by means of the following equations, respectively.

$\phi_a = C_a lo(N(H)' - N(H))$ $\phi_{0a} = C_0(N_0' - N_0)$ where,

Calo: local curvature at each height of the aspherical surface;

$C_0$: standard curvature of the aspherical surface;

$N(H)'$: refractive index at each height of the medium on the object side of the aspherical surface;

$N(H)$: refractive index at each height of the medium on the image side of the aspherical surface;

$N_0'$: refractive index along the optical axis of the medium on the object side of the aspherical surface; and $N_0$: refractive index along the optical axis of the medium on the image side of the aspherical surface.

Condition (12) is a condition that must be satisfied by an aspherical surface when it is employed in the first lens unit. If the upper limit of condition (12) is exceeded, the various negative aberrations that occur on account of the spherical surfaces in the lens unit are exacerbated by the presence of the aspherical surface, which is undesirable. If the lower limit of condition (12) is exceeded, correction performed by the aspherical surface becomes excessive, e.g., even where there is more than one aspherical surface, it becomes difficult to offset the excessive correction by using other aspherical surfaces, which is undesirable.

Where an aspherical surface is employed in one of the lens elements of the first lens unit, making both surfaces of said lens element aspherical increases the degree of freedom resulting from the increase in the number of aspherical surfaces, making the aberration correction effect more pronounced, which is extremely desirable.

Where a GRIN lens is employed in the second lens unit, it is desirable for said GRIN lens to satisfy condition (13) set forth below.

In a range defined by $0 < H < 0.5$ H max, $$\frac{d}{dH}\{v_d(H)\} < 0.0 \tag{13}$$

In a range defined by $0 < H < H$ max $$-1.0 < \frac{v_d(H) - v_d(0)}{v_d(0)} \leq 0.0 \tag{14}$$

where, $v_d(H)$: dispersion of the GRIN lens at a point that is height H away from the optical axis, in the direction perpendicular to the optical axis, having a definition identical to that in condition (6).

$$-0.1 < \frac{N_1\lambda 2 - N_1 d2}{\phi 2G^2} < 0.1 \tag{15}$$

where, $N_1 d2$: secondary refractive index distribution coefficient of the GRIN lens used in the second lens unit relative to the d-line;

$N_1\lambda 2$: secondary refractive index distribution coefficient of the GRIN lens used in the second lens unit relative to the C-line and the F-line; and, $\phi 2G$: refractive power of the GRIN lens used in the second lens unit.

$$\left|\frac{N_2 d2}{\phi 2G^4}\right| < 100 \tag{16}$$

where, $N_2 d2$: quaternary refractive index distribution coefficient of the GRIN lens used in the second lens unit relative to the d-line; and $\phi 2G$: refractive power of the GRIN lens used in the second lens unit.

Where a GRIN lens is used in the second lens unit, the GRIN lens serves to perform correction of various types of aberration (particularly Petzval sum), including correction of chromatic aberration. These conditions are conditions regarding dispersion and the refractive index distribution coefficients that must be satisfied by a GRIN lens when it is used in the second lens unit. If the ranges defined by conditions (13), (14) and (15) are exceeded, correction of chromatic aberration in the entire optical system becomes extremely difficult due to the chromatic aberration arising in the second lens unit. If the range defined by condition (16) is exceeded, the refractive index distribution becomes too large, making manufacturing difficult, and higher order aberrations also arise, making aberration correction difficult, which is undesirable.

Where a GRIN lens is used in the second lens unit, it is desirable for said GRIN lens to satisfy condition (17) set forth below.

$$-0.5 < \frac{\phi 2GM}{\phi 2GS} < 1.0 \tag{17}$$

where, $\phi 2GS$: refractive power of the surface of the GRIN lens used in the second lens unit; and $\phi 2GM$: refractive power of the medium of the GRIN lens used in the second lens unit.

Here, where the refractive power of the GRIN lens used in the second lens unit is deemed $\phi 2G$, $\phi 2GS$ and $\phi 2GM$ are expressed by means of the following equation.

$\phi 2G = \phi 2GM + \phi 2GS$ $\phi 2GS$ is the refractive power (the refractive index is the refractive index along the optical axis of the lens) where the lens is a homogeneous lens. $\phi 2GM$ is the refractive power that the medium has due to the fact that the lens has a refractive index distribution, and is expressed by means of the following equation.

$\phi 2GM = -2N_1 d2 \cdot T2G$ where,

T2G: core thickness of the GRIN lens used in the second lens unit; and $N_1 d2$: secondary refractive index distribution coefficient of the GRIN lens used in the second lens unit relative to the d-line.

Condition (17) is a condition that must be satisfied by a GRIN lens when it is used in the second lens unit. If the upper limit of condition (17) is exceeded, the refractive index distribution becomes too large, making manufacturing difficult, and higher order aberrations also arise, which is undesirable. If the lower limit of condition (17) is exceeded, the refractive index distribution becomes too small, making Petzval sum correction difficult, and the aberration correction effect of the refractive index distribution also decreases, making correction of various types of aberration difficult, which is not desirable.

Where a GRIN lens is used in the second lens unit, it is desirable for said GRIN lens to satisfy condition (18) set forth below.

$$0.0 < \frac{R_{22} + R_{21}}{R_{22} - R_{21}} < 10.0 \qquad (18)$$

where, $R_{21}$: radius of curvature of the object side surface of the second lens unit; and $R_{22}$: radius of curvature of the image side surface of the second lens unit.

Condition (18) governs the configuration of the GRIN lens where a GRIN lens is used in the second lens unit. If the upper limit of condition (18) is exceeded, spherical aberration in particular tends to tilt toward the negative side in the aberration diagram, which is undesirable. If the lower limit of condition (18) is exceeded, spherical aberration tends to tilt toward the positive side in the aberration diagram, which is also undesirable. In addition, coma aberration becomes undesirably large outside the range defined by condition (18).

Where the second lens unit comprises a single GRIN lens, it is desirable for said lens to be either a positive lens with a strongly curved convex surface on the object side or a positive meniscus lens with the convex surface on the object side. In this way, spherical aberration in particular may be corrected.

By having at least one aspherical lens surface in the second lens unit, freedom to perform aberration correction increases and the number of lens elements in the lens unit may be reduced to the minimum of one while allowing wide-angle zooming.

Where an aspherical surface is employed in one of the lens elements of the second lens unit, it is desirable for said aspherical surface to satisfy condition (19) set forth below.

In a range defined by $0<H<H$ max, $$-6.0 < \frac{\phi_a - \phi_{0a}}{\phi_2} < 5.0 \qquad (19)$$

where, $\phi_a$: local refractive power of the aspherical surface;

$\phi_{0a}$: refractive power based on the standard curvature of the aspherical surface; and $\phi_2$: refractive power of the second lens unit, where $\phi_a$ and $\phi_{0a}$ are expressed by means of the following equations, respectively.

$\phi_a = C a l o (N(H)' - N(H))$ $\phi_{0a} = C_0 (N_0' - N_0)$ where,

Calo: local curvature at each height of the aspherical surface;

$C_0$: standard curvature of the aspherical surface;

$N(H)'$: refractive index at each height of the medium on the object side of the aspherical surface;

$N(H)$: refractive index at each height of the medium on the image side of the aspherical surface;

$N_0'$: refractive index along the optical axis of the medium on the object side of the aspherical surface; and $N_0$: refractive index along the optical axis of the medium on the image side of the aspherical surface.

Condition (19) is a condition that must be satisfied by an aspherical surface when it is employed in the second lens unit. If the upper limit of condition (19) is exceeded, the various positive aberrations that occur on account of the spherical surfaces in the lens unit are exacerbated by the presence of the aspherical surface, which is undesirable. If the lower limit of condition (19) is exceeded, correction performed by the aspherical surface becomes excessive, e.g., even where there is more than one aspherical surface, it becomes difficult to offset the excessive correction by other aspherical surfaces, which is undesirable.

Where an aspherical surface is employed in one of the lens elements of the second lens unit, making both surfaces of said lens element aspherical increases the degree of freedom resulting from the increase in the number of aspherical surfaces, making the aberration correction effect more pronounced, which is extremely desirable.

In a zoom lens system comprising multiple lens units including, from the object side, a first lens unit having a negative refractive power and a second lens unit having a positive refractive power, wherein said zoom lens system varies magnification by changing the distance between at least the first and second lens units, it is desirable for condition (20) set forth below to be satisfied.

$$0.3 < \left| \frac{\phi_1}{\phi_2} \right| < 1.0 \qquad (20)$$

where, $\phi_1$: refractive power of first lens unit; and $\phi_2$: refractive power of second lens unit.

Condition (20) is a condition that must be satisfied by the two component type zoom lens system which is composed, in order from the object side, a first lens unit having negative power and a second lens unit having positive power, and is aimed at allowing compactness and balanced aberration correction in a zoom lens system capable of wide-angle zooming. If the upper limit of condition (20) is exceeded, the refractive power of the first lens unit becomes large relative to the refractive power of the second lens unit, and consequently it becomes difficult for the second lens unit to correct the aberration occurring in the first lens unit, which is undesirable. If the lower limit of condition (20) is exceeded, either the refractive power of the first lens unit becomes too small and the total length of the entire optical system increases, or the refractive power of the second lens unit becomes too large and aberration correction becomes difficult, both of which are undesirable.

Numerical examples for the zoom lens system pertaining to the present invention are provided below with reference to construction data and aberration drawings.

Numerical examples 1 through 4 provided below correspond to the embodiments described above, respectively. In each numerical example, ri (i=1, 2, 3, . . . ) represents the radius of curvature of ith surface Si counted from the object side, di (i=1, 2, 3, . . . ) represents the ith axial distance counted from the object side, and Ndi (i=1, 2, 3, . . . ) and vi (I=1, 2, 3, . . . ) represent the refractive index relative to the d-line and the Abbe number of the ith lens counted from the object side, respectively. In each embodiment, the lens having a medium as to which GRINi (i=1, 2, 3, . . . ) is indicated under the Nd column is a gradient index lens, and its refractive index distribution is defined using glass data Ni (i=0, 1, 2, 3 . . . ) based on equation (1).

Further, in each numerical example, the surface marked with an asterisk in the radius of curvature column is an aspherical surface, and is defined by means of the equation set forth below that expresses the configuration of an aspherical surface.

$$x(H) = \frac{c \cdot H^2}{1 + \sqrt{1 - \varepsilon \cdot c^2 \cdot H^2}} + \sum_{i \geq 2} A_i \cdot H^i$$

where,

H: height in the direction perpendicular to the optical axis;

$\chi(H)$: deviation from the reference plane in the direction of the optical axis;

c: paraxial curvature;

$\varepsilon$: quadric surface parameter; and

Ai: ith aspherical surface coefficient.

Values for focal length f of the entire optical system, angle of view $2\omega$, F-number Fno. and the distance (axial distance) between the lens units are shown from the left with regard to the shortest focal length condition (W), middle focal length condition (M) and longest focal length condition (T), in that order.

FIGS. 5, 8, 11 and 14 show aberrations in the shortest focal length condition for numerical examples 1 through 4, respectively. FIGS. 6, 9, 12 and 15 show aberrations in the middle focal length condition for numerical examples 1 through 4, respectively. FIGS. 7, 10, 13 and 16 show aberrations in the longest focal length condition for numerical examples 1 through 4, respectively.

In said FIGS. 5 through 16, the drawings under 'A' show spherical aberration and sine condition. Solid line (d) represents the spherical aberration relative to the d-line, chain line (g) represents the spherical aberration relative to the g-line, two-dot chain line (c) represents the spherical aberration relative to the c-line, and dotted line (SC) represents the unsatisfied amount of the sine condition. The drawings under 'B' show the degree of astigmatism. Dotted line (DM) and solid line (DS) represent the astigmatism relative to the d-line on the meridional plane and the sagital plane, respectively. The drawings under 'C' show the degree of distortion.

Further, tables 5 through 8 show the values for the conditions regarding embodiments 1 through 4.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

TABLE 1

1st Embodiment f = 36.000 mm to 49.991 mm to 68.123 mm
$2\omega$ = 63.4° to 47.0° to 34.8°
Fno. = 4.10 to 5.10 to 5.80

| Radius of Curvature | | Axial Distance | | Refractive Index | | Abbe number |
|---|---|---|---|---|---|---|
| r1* | 4037.631 | | | | | |
| | | d1 | 2.50 | | GRIN 1 | |
| r2* | 58.415 | | | | | |
| | | d2 | 60.345 | to 33.945 | to 15.860 | |
| r3* | 14.413 | | | | | |
| | | d3 | 12.53 | | GRIN 2 | |
| r4* | 23.023 | | | | | |
| | | d4 | 3.000 | to 11.045 | to 19.000 | |
| r5 | ∞ | | | | | |

TABLE 1-continued

1st Embodiment

Aspherical Coefficient

| r1* | $\varepsilon$ | 1.00000000 |
| | A4 | $0.22634139 \times 10^{-5}$ |
| | A6 | $0.37579363 \times 10^{-8}$ |
| | A8 | $0.15751882 \times 10^{-11}$ |
| | A10 | $-0.11685814 \times 10^{-13}$ |
| | A12 | $0.24917647 \times 10^{-16}$ |
| r2* | $\varepsilon$ | 1.00000000 |
| | A4 | $0.11036103 \times 10^{-5}$ |
| | A6 | $0.28156342 \times 10^{-7}$ |
| | A8 | $-0.38415734 \times 10^{-10}$ |
| | A10 | $-0.15216762 \times 10^{-13}$ |
| | A12 | $0.12647225 \times 10^{-15}$ |
| r3* | $\varepsilon$ | 1.00000000 |
| | A4 | $-0.19553410 \times 10^{-4}$ |
| | A6 | $-0.10603902 \times 10^{-6}$ |
| | A8 | $0.15130429 \times 10^{-8}$ |
| | A10 | $0.41388087 \times 10^{-11}$ |
| | A12 | $-0.27649338 \times 10^{-13}$ |
| r4* | $\varepsilon$ | 1.00000000 |
| | A4 | $0.13869451 \times 10^{-3}$ |
| | A6 | $0.11450484 \times 10^{-5}$ |
| | A8 | $0.17213533 \times 10^{-8}$ |
| | A10 | $-0.12948900 \times 10^{-9}$ |
| | A12 | $0.15656087 \times 10^{-11}$ |

Refractive Index Distribution Coefficient

| | d-line | C-line | F-line |
|---|---|---|---|
| GRIN 1 | | | |
| N0 | 1.65446 | 1.64881 | 1.66814 |
| N1 | $0.18547494 \times 10^{-3}$ | $0.19486233 \times 10^{-3}$ | $0.15675022 \times 10^{-3}$ |
| N2 | $-0.57615573 \times 10^{-6}$ | $-0.58630706 \times 10^{-}$ | $-0.49493341 \times 10^{-6}$ |
| N3 | $0.15723864 \times 10^{-9}$ | $0.16477082 \times 10^{-9}$ | $-0.68683695 \times 10^{-10}$ |
| N4 | $0.90975547 \times 10^{-12}$ | $0.90997387 \times 10^{-12}$ | $0.11831078 \times 10^{-11}$ |
| GRIN 2 | | | |
| N0 | 1.63854 | 1.63507 | 1.64655 |
| N1 | $0.59370375 \times 10^{-4}$ | $0.54021718 \times 10^{-4}$ | $0.74927284 \times 10^{-4}$ |
| N2 | $-0.25636093 \times 10^{-5}$ | $-0.26396527 \times 10^{-5}$ | $-0.25768003 \times 10^{-5}$ |
| N3 | $-0.35767477 \times 10^{-7}$ | $-0.33838161 \times 10^{-7}$ | $-0.36009650 \times 10^{-7}$ |
| N4 | $0.43083265 \times 10^{-9}$ | $0.41322478 \times 10^{-9}$ | $0.44169366 \times 10^{-9}$ |

TABLE 2

2nd Embodiment f = 36.000 mm to 50.000 mm to 68.200 mm
$2\omega$ = 64.1° to 47.0° to 34.9°
Fno. = 4.10 to 5.10 to 5.80

| Radius of Curvature | | Axial Distance | | Refractive Index | | Abbe number | |
|---|---|---|---|---|---|---|---|
| r1 | 136.008 | | | | | | |
| | | d1 | 1.50 | | Nd1 | 1.74400 | $v_1$ 44.93 |
| r2 | 19.911 | | | | | | |
| | | d2 | 5.15 | | | | |
| r3 | 31.795 | | | | | | |
| | | d3 | 5.50 | | Nd2 | 1.71736 | $v_2$ 29.42 |
| r4* | 86.076 | | | | | | |
| | | d4 | 42.658 | to 22.394 | to 8.489 | | |
| r5* | 16.201 | | | | | | |

TABLE 2-continued

2nd Embodiment

| | | d5 | 14.00 | | GRIN 1 | |
|---|---|---|---|---|---|---|
| r6* | 35.288 | | | | | |
| | | d6 | 3.000 | to 11.045 | to 22.500 | |
| r7 | ∞ | | | | | |

Aspherical Coefficient

| r4* | $\epsilon$ | 1.00000000 |
|---|---|---|
| | A4 | $-0.79212103 \times 10^{-5}$ |
| | A6 | $0.29111842 \times 10^{-7}$ |
| | A8 | $-0.52063633 \times 10^{-9}$ |
| | A10 | $0.42825696 \times 10^{-11}$ |
| | A12 | $-0.22550327 \times 10^{-13}$ |
| | A14 | $0.63015766 \times 10^{-16}$ |
| | A16 | $-0.71706759 \times 10^{-19}$ |
| r5* | $\epsilon$ | 1.00000000 |
| | A4 | $-0.22144183 \times 10^{-4}$ |
| | A6 | $-0.22122743 \times 10^{-6}$ |
| | A8 | $0.16723337 \times 10^{-8}$ |
| | A10 | $0.16617084 \times 10^{-10}$ |
| | A12 | $-0.10125386 \times 10^{-12}$ |
| r6* | $\epsilon$ | 1.00000000 |
| | A4 | $0.13270385 \times 10^{-3}$ |
| | A6 | $0.35003003 \times 10^{-6}$ |
| | A8 | $0.48925607 \times 10^{-8}$ |
| | A10 | $-0.64250783 \times 10^{-10}$ |
| | A12 | $-0.18667289 \times 10^{-13}$ |

Refractive Index Distribution Coefficient

| GRIN 1 | d-line | C-line | F-line |
|---|---|---|---|
| N0 | 1.63854 | 1.63507 | 1.64655 |
| N1 | $0.97214773 \times 10^{-4}$ | $0.90841969 \times 10^{-4}$ | $0.11125049 \times 10^{-3}$ |
| N2 | $-0.30358299 \times 10^{-5}$ | $-0.29332896 \times 10^{-5}$ | $-0.29230969 \times 10^{-5}$ |
| N3 | $-0.30714188 \times 10^{-7}$ | $-0.34260219 \times 10^{-7}$ | $-0.35004636 \times 10^{-7}$ |
| N4 | $0.34342883 \times 10^{-9}$ | $0.37243574 \times 10^{-9}$ | $0.38116150 \times 10^{-9}$ |

TABLE 3

3rd Embodiment f = 29.000 mm to 47.700 mm to 78.000 mm
2ω = 75.7° to 48.4° to 30.6°
Fno. = 4.10 to 5.10 to 5.80

| | Radius of Curvature | | Axial Distance | | Refractive Index | Abbe number |
|---|---|---|---|---|---|---|
| r1 | 32.716 | | | | | |
| | | d1 | 1.20 | | Nd1 1.77551 | $\nu_1$ 37.90 |
| r2 | 16.467 | | | | | |
| | | d2 | 10.42 | | | |
| r3 | 47.393 | | | | | |
| | | d3 | 3.00 | | Nd2 1.71300 | $\nu_2$ 53.93 |
| r4 | 24.890 | | | | | |
| | | d4 | 0.56 | | | |
| r5 | 29.226 | | | | | |
| | | d5 | 5.00 | | Nd3 1.67339 | $\nu_3$ 29.25 |
| r6* | 83.223 | | | | | |
| | | d6 | 39.233 | to 16.495 | to 2.797 | |
| r7* | 17.318 | | | | | |
| | | d7 | 18.49 | | GRIN 1 | |
| r8* | 48.398 | | | | | |
| | | d8 | 1.002 | to 4.995 | to 9.980 | |
| r9 | ∞ | | | | | |

Aspherical Coefficient

| r6* | $\epsilon$ | 1.00000000 |
|---|---|---|
| | A4 | $-0.17931811 \times 10^{-4}$ |
| | A6 | $0.67609958 \times 10^{-7}$ |

TABLE 3-continued

3rd Embodiment

| | A8 | $-0.11945820 \times 10^{-8}$ |
|---|---|---|
| | A10 | $0.64810612 \times 10^{-11}$ |
| | A12 | $-0.15077086 \times 10^{-13}$ |
| r7* | $\epsilon$ | 1.00000000 |
| | A4 | $-0.43588019 \times 10^{-5}$ |
| | A6 | $0.40358792 \times 10^{-8}$ |
| | A8 | $0.10445277 \times 10^{-8}$ |
| | A10 | $0.45257817 \times 10^{-11}$ |
| | A12 | $-0.37698794 \times 10^{-13}$ |
| r8* | $\epsilon$ | 1.00000000 |
| | A4 | $0.69837373 \times 10^{-4}$ |
| | A6 | $0.34364995 \times 10^{-6}$ |
| | A8 | $-0.61219902 \times 10^{-8}$ |
| | A10 | $0.64103407 \times 10^{-10}$ |
| | A12 | $-0.28100780 \times 10^{-12}$ |

Refractive Index Distribution Coefficient

| GRIN 1 | d-line | C-line | F-line |
|---|---|---|---|
| N0 | 1.71736 | 1.71028 | 1.73466 |
| N1 | $0.15610612 \times 10^{-3}$ | $0.14655336 \times 10^{-3}$ | $0.18104845 \times 10^{-3}$ |
| N2 | $0.15463205 \times 10^{-6}$ | $0.11166026 \times 10^{-6}$ | $0.21402160 \times 10^{-6}$ |
| N3 | $-0.29324136 \times 10^{-8}$ | $-0.27000653 \times 10^{-8}$ | $-0.27578690 \times 10^{-8}$ |
| N4 | $0.22095027 \times 10^{-9}$ | $0.21667925 \times 10^{-9}$ | $0.22786648 \times 10^{-9}$ |

TABLE 4

4th Embodiment f = 35.995 mm to 49.982 mm to 68.220 mm
2ω = 64.2° to 47.2° to 34.8°
Fno. = 4.10 to 5.10 to 5.80

| | Radius of Curvature | | Axial Distance | | Refractive Index | Abbe number |
|---|---|---|---|---|---|---|
| r1* | 63.527 | | | | | |
| | | d1 | 5.00 | | GRIN 1 | |
| r2* | 37.291 | | | | | |
| | | d2 | 51.867 | to 28.691 | to 11.800 | |
| r3* | 13.303 | | | | | |
| | | d3 | 11.65 | | GRIN 2 | |
| r4* | 27.834 | | | | | |
| | | d4 | 4.000 | to 10.546 | to 16.000 | |
| r5* | -12.052 | | | | | |
| | | d5 | 3.81 | | Nd3 1.74400 | $\nu_3$ 44.93 |
| r6* | -12.366 | | | | | |
| | | d6 | 7.166 | to 8.930 | to 14.141 | |
| r7 | ∞ | | | | | |

Aspherical Coefficient

| r1* | $\epsilon$ | 1.00000000 |
|---|---|---|
| | A4 | $-0.20093614 \times 10^{-4}$ |
| | A6 | $0.18539555 \times 10^{-7}$ |
| | A8 | $0.14587320 \times 10^{-10}$ |
| | A10 | $-0.53813924 \times 10^{-13}$ |
| | A12 | $0.43566914 \times 10^{-16}$ |
| r2* | $\epsilon$ | 1.00000000 |
| | A4 | $-0.28363515 \times 10^{-4}$ |
| | A6 | $0.53734423 \times 10^{-7}$ |
| | A8 | $-0.78378549 \times 10^{-10}$ |
| | A10 | $0.10768977 \times 10^{-12}$ |
| | A12 | $-0.36218087 \times 10^{-19}$ |
| r3* | $\epsilon$ | 1.00000000 |
| | A4 | $-0.16428461 \times 10^{-4}$ |
| | A6 | $0.35211001 \times 10^{-7}$ |
| | A8 | $0.43864965 \times 10^{-8}$ |
| | A10 | $0.62083049 \times 10^{-11}$ |
| | A12 | $-0.15675516 \times 10^{-12}$ |

TABLE 4-continued

4th Embodiment

| | | |
|---|---|---|
| r4* | ε | 1.00000000 |
| | A4 | $0.14001076 \times 10^{-3}$ |
| | A6 | $0.11415582 \times 10^{-5}$ |
| | A8 | $-0.10747127 \times 10^{-7}$ |
| | A10 | $-0.12891611 \times 10^{-9}$ |
| | A12 | $0.25750993 \times 10^{-11}$ |
| r5* | ε | 1.00000000 |
| | A4 | $-0.28437248 \times 10^{-4}$ |
| | A6 | $0.15528714 \times 10^{-6}$ |
| | A8 | $-0.20834691 \times 10^{-8}$ |
| | A10 | $0.15018871 \times 10^{-10}$ |
| | A12 | $-0.15995618 \times 10^{-11}$ |
| r6* | ε | 1.00000000 |
| | A4 | $0.14701830 \times 10^{-5}$ |
| | A6 | $-0.61218425 \times 10^{-7}$ |
| | A8 | $0.18314250 \times 10^{-8}$ |
| | A10 | $-0.79571149 \times 10^{-11}$ |
| | A12 | $-0.22202161 \times 10^{-12}$ |

Refractive Index Distribution Coefficient

| | d-line | C-line | F-line |
|---|---|---|---|
| GRIN 1 | | | |
| N0 | 1.65446 | 1.64881 | 1.66814 |
| N1 | $0.56373555 \times 10^{-3}$ | $0.56804756 \times 10^{-3}$ | $0.54557457 \times 10^{-3}$ |
| N2 | $-0.61291590 \times 10^{-6}$ | $-0.60363481 \times 10^{-6}$ | $-0.58617475 \times 10^{-6}$ |
| N3 | $0.49165569 \times 10^{-12}$ | $-0.35202135 \times 10^{-10}$ | $0.16413222 \times 10^{-10}$ |
| N4 | $-0.79133907 \times 10^{-12}$ | $-0.75282501 \times 10^{-12}$ | $-0.90016071 \times 10^{-12}$ |
| GRIN 2 | | | |
| N0 | 1.63854 | 1.63507 | 1.64655 |
| N1 | $0.43016585 \times 10^{-3}$ | $0.41911533 \times 10^{-3}$ | $0.45544121 \times 10^{-3}$ |
| N2 | $-0.79710512 \times 10^{-6}$ | $-0.78523464 \times 10^{-6}$ | $-0.68775905 \times 10^{-6}$ |
| N3 | $-0.17119799 \times 10^{-7}$ | $-0.18019875 \times 10^{-7}$ | $-0.17930027 \times 10^{-7}$ |
| N4 | $0.11606367 \times 10^{-8}$ | $0.11558639 \times 10^{-8}$ | $0.11905159 \times 10^{-8}$ |

TABLE 5

(1st embodiment)

Entire zoom lens system

| Condition (20) | $\left|\dfrac{\phi_1}{\phi_2}\right|$ | 0.487 |
|---|---|---|

First lens unit (Gradient index lens G1)

| Condition (2) | $\mathrm{sgn}(\phi 1) \cdot \dfrac{N_1 d1}{\phi 1^2}$ | 1.294 |
|---|---|---|
| Condition (8) | $\dfrac{N_1 d1}{\phi 1 G^2}$ | 1.294 |
| Condition (9) | $\left|\dfrac{N_2 d1}{\phi 1 G^4}\right|$ | 28.026 |
| Condition (7) | $\dfrac{N_1 F1 - N_1 d1}{\phi 1 G^2}$ | -0.200 |
| Condition (7) | $\dfrac{N_1 C1 - N_1 d1}{\phi 1 G^2}$ | 0.065 |
| Condition (10) | $\dfrac{\phi 1 GM}{\phi 1 GS}$ | 0.084 |
| Condition (11) | $\dfrac{R_{12} + R_{11}}{R_{12} - R_{11}}$ | -1.029 |

| Condition (5) | Condition (12) |
|---|---|
| $\dfrac{\nu_d(H) - \nu_d(0)}{\nu_d(0)}$ | $\dfrac{\phi_a - \phi_{0a}}{\phi 1}$ |

| | | (r1) | (r2) |
|---|---|---|---|
| 0.0 H max | 0.000 | 0.000 | 0.000 |
| 0.1 H max | 0.009 | -0.006 | 0.004 |
| 0.2 H max | 0.038 | -0.027 | 0.021 |
| 0.3 H max | 0.084 | -0.066 | 0.066 |
| 0.4 H max | 0.147 | -0.130 | 0.158 |
| 0.5 H max | 0.225 | -0.230 | 0.313 |
| 0.6 H max | 0.321 | -0.375 | 0.531 |
| 0.7 H max | 0.436 | -0.586 | 0.801 |
| 0.8 H max | 0.575 | -0.906 | 1.126 |
| 0.9 H max | 0.733 | -1.463 | 1.580 |
| 1.0 H max | 0.861 | -2.559 | 2.343 |

Second lens unit (Gradient index lens G2)

| Condition (2) | $\mathrm{sgn}(\phi 2) \cdot \dfrac{N_1 d2}{\phi 2^2}$ | -0.098 |
|---|---|---|
| Condition (3) | $\dfrac{N_1 d2}{\phi 2^2}$ | 0.098 |
| Condition (16) | $\left|\dfrac{N_2 d2}{\phi 2 G^4}\right|$ | 7.017 |
| Condition (15) | $\dfrac{N_1 F2 - N_1 d2}{\phi 2 G^2}$ | 0.026 |
| Condition (15) | $\dfrac{N_1 C2 - N_1 d2}{\phi 2 G^2}$ | -0.009 |
| Condition (17) | $\dfrac{\phi 2 GM}{\phi 2 GS}$ | -0.057 |
| Condition (18) | $\dfrac{R_{22} + R_{21}}{R_{22} - R_{21}}$ | 4.348 |

| Condition (14) | Condition (19) |
|---|---|
| $\dfrac{\nu_d(H) - \nu_d(0)}{\nu_d(0)}$ | $\dfrac{\phi_a - \phi_{0a}}{\phi 2}$ |

| | | (r3) | (r4) |
|---|---|---|---|
| 0.0 H max | 0.000 | 0.000 | -0.000 |
| 0.1 H max | -0.001 | -0.004 | -0.021 |
| 0.2 H max | -0.004 | -0.014 | -0.088 |
| 0.3 H max | -0.009 | -0.032 | -0.204 |
| 0.4 H max | -0.017 | -0.056 | -0.378 |
| 0.5 H max | -0.027 | -0.083 | -0.617 |
| 0.6 H max | -0.039 | -0.111 | -0.920 |
| 0.7 H max | -0.053 | -0.130 | -1.273 |
| 0.8 H max | -0.071 | -0.130 | -1.644 |

TABLE 5-continued (1st embodiment)

| | | | |
|---|---|---|---|
| 0.9 H max | −0.091 | −0.101 | −1.995 |
| 1.0 H max | −0.117 | −0.034 | −2.297 |

TABLE 6

(2nd embodiment)

Entire zoom lens system

| Condition (20) | $\left|\dfrac{\phi_1}{\phi_2}\right|$ | 0.617 |
|---|---|---|

First lens unit

Condition (12)

$$\dfrac{\phi_a - \phi_{0a}}{\phi 1}$$

| | (r4) |
|---|---|
| 0.0 H max | 0.000 |
| 0.1 H max | −0.008 |
| 0.2 H max | −0.032 |
| 0.3 H max | −0.069 |
| 0.4 H max | −0.121 |
| 0.5 H max | −0.196 |
| 0.6 H max | −0.303 |
| 0.7 H max | −0.457 |
| 0.8 H max | −0.690 |
| 0.9 H max | −1.044 |
| 1.0 H max | −1.558 |

Second lens unit (Gradient index lens G3)

| Condition (2) | $\mathrm{sgn}(\phi 2) \cdot \dfrac{N_1 d2}{\phi 2^2}$ | −0.156 |
|---|---|---|
| Condition (3) | $\dfrac{N_1 d2}{\phi 2^2}$ | 0.156 |
| Condition (16) | $\left|\dfrac{N_2 d2}{\phi 2G^4}\right|$ | 7.833 |
| Condition (15) | $\dfrac{N_1 F2 - N_1 d2}{\phi 2G^2}$ | 0.023 |
| Condition (15) | $\dfrac{N_1 C2 - N_1 d2}{\phi 2G^2}$ | −0.010 |
| Condition (17) | $\dfrac{\phi 2GM}{\phi 2GS}$ | −0.012 |
| Condition (18) | $\dfrac{R_{22} + R_{21}}{R_{22} - R_{21}}$ | 2.269 |

| | Condition (14) | Condition (19) |
|---|---|---|
| | $\dfrac{v_d(H) - v_d(0)}{v_d(0)}$ | $\dfrac{\phi_a - \phi_{0a}}{\phi 2}$ |
| | (r5) | (r6) |
| 0.0 H max | 0.000 | 0.000 |
| 0.1 H max | −0.001 | 0.004 | 0.020 |
| 0.2 H max | −0.004 | 0.018 | 0.081 |
| 0.3 H max | −0.010 | 0.043 | 0.184 |

TABLE 6-continued (2nd embodiment)

| 0.4 H max | −0.018 | 0.079 | 0.333 |
| 0.5 H max | −0.028 | 0.125 | 0.532 |
| 0.6 H max | −0.041 | 0.174 | 0.784 |
| 0.7 H max | −0.056 | 0.212 | 1.082 |
| 0.8 H max | −0.074 | 0.216 | 1.405 |
| 0.9 H max | −0.096 | 0.164 | 1.700 |
| 1.0 H max | −0.120 | 0.042 | 1.880 |

TABLE 7

(3rd embodiment)

Entire zoom lens system

| Condition (20) | $\left|\dfrac{\phi_1}{\phi_2}\right|$ | 1.395 |
|---|---|---|

First lens unit

Condition (12)

$$\dfrac{\phi_a - \phi_{0a}}{\phi 1}$$

| | (r) |
|---|---|
| 0.0 H max | 0.000 |
| 0.1 H max | −0.017 |
| 0.2 H max | −0.064 |
| 0.3 H max | −0.140 |
| 0.4 H max | −0.251 |
| 0.5 H max | −0.421 |
| 0.6 H max | −0.682 |
| 0.7 H max | −1.069 |
| 0.8 H max | −1.665 |
| 0.9 H max | −2.815 |
| 1.0 H max | −5.629 |

Second lens unit (Gradient index lens G3)

| Condition (2) | $\mathrm{sgn}(\phi 2) \cdot \dfrac{N_1 d2}{\phi 2^2}$ | −0.195 |
|---|---|---|
| Condition (3) | $\dfrac{N_1 d2}{\phi 2^2}$ | 0.195 |
| Condition (16) | $\left|\dfrac{N_2 d2}{\phi 2G^4}\right|$ | 0.242 |
| Condition (15) | $\dfrac{N_1 F2 - N_1 d2}{\phi 2G^2}$ | 0.031 |
| Condition (15) | $\dfrac{N_1 C2 - N_1 d2}{\phi 2G^2}$ | −0.012 |
| Condition (17) | $\dfrac{\phi 2GM}{\phi 2GS}$ | −0.013 |
| Condition (18) | $\dfrac{R_{22} + R_{21}}{R_{22} - R_{21}}$ | 2.114 |

TABLE 7-continued (3rd embodiment)

| | Condition (14) | | Condition (19) | |
|---|---|---|---|---|
| | $\dfrac{\nu_d(H) - \nu_d(0)}{\nu_d(0)}$ | | $\dfrac{\phi_a - \phi_{0a}}{\phi 2}$ | |
| | | (r5) | | (r6) |
| 0.0 H max | 0.000 | 0.000 | | 0.000 |
| 0.1 H max | −0.001 | 0.001 | | 0.012 |
| 0.2 H max | −0.004 | 0.003 | | 0.049 |
| 0.3 H max | −0.010 | 0.007 | | 0.113 |
| 0.4 H max | −0.018 | 0.007 | | 0.206 |
| 0.5 H max | −0.029 | −0.001 | | 0.328 |
| 0.6 H max | −0.042 | −0.031 | | 0.476 |
| 0.7 H max | −0.059 | −0.096 | | 0.647 |
| 0.8 H max | −0.079 | −0.208 | | 0.835 |
| 0.9 H max | −0.102 | −0.357 | | 1.035 |
| 1.0 H max | −0.131 | −0.495 | | 1.231 |

TABLE 8

(4th embodiment)

Entire zoom lens system

| Condition (20) | $\left|\dfrac{\phi_1}{\phi_2}\right|$ | 0.523 |
|---|---|---|

First lens unit (Gradient index lens G1)

| Condition (2) | $\mathrm{sgn}(\phi 1) \cdot \dfrac{N_1 d1}{\phi 1^2}$ | 3.657 |
|---|---|---|
| Condition (8) | $\dfrac{N_1 d1}{\phi 1 G^2}$ | 3.657 |
| Condition (9) | $\left|\dfrac{N_2 d1}{\phi 1 G^4}\right|$ | 25.799 |
| Condition (7) | $\dfrac{N_1 F1 - N_1 d1}{\phi 1 G^2}$ | −0.118 |
| Condition (7) | $\dfrac{N_1 C1 - N_1 d1}{\phi 1 G^2}$ | 0.045 |
| Condition (10) | $\dfrac{\phi 1 GM}{\phi 1 GS}$ | 0.832 |
| Condition (11) | $\dfrac{R_{12} + R_{11}}{R_{12} - R_{11}}$ | −3.843 |

| | Condition (5) | | Condition (12) | |
|---|---|---|---|---|
| | $\dfrac{\nu_d(H) - \nu_d(0)}{\nu_d(0)}$ | | $\dfrac{\phi_a - \phi_{0a}}{\phi 1}$ | |
| | | (r1) | | (r2) |
| 0.0 H max | 0.000 | 0.000 | | 0.000 |
| 0.1 H max | 0.008 | 0.045 | | −0.050 |
| 0.2 H max | 0.031 | 0.177 | | −0.189 |
| 0.3 H max | 0.070 | 0.380 | | −0.389 |
| 0.4 H max | 0.124 | 0.632 | | −0.614 |
| 0.5 H max | 0.193 | 0.899 | | −0.825 |
| 0.6 H max | 0.276 | 1.136 | | −0.980 |
| 0.7 H max | 0.369 | 1.300 | | −1.025 |
| 0.8 H max | 0.470 | 1.359 | | −0.866 |

TABLE 8-continued (4th embodiment)

| 0.9 H max | 0.581 | 1.293 | −0.322 |
|---|---|---|---|
| 1.0 H max | 0.726 | 1.053 | 0.913 |

Second lens unit (Gradient index lens G2)

| Condition (2) | $\mathrm{sgn}(\phi 2) \cdot \dfrac{N_1 d2}{\phi 2^2}$ | −0.763 |
|---|---|---|
| Condition (3) | $\dfrac{N_1 d2}{\phi 2^2}$ | 0.763 |
| Condition (16) | $\left|\dfrac{N_2 d2}{\phi 2 G^4}\right|$ | 2.510 |
| Condition (15) | $\dfrac{N_1 F2 - N_1 d2}{\phi 2 G^2}$ | 0.028 |
| Condition (15) | $\dfrac{N_1 C2 - N_1 d2}{\phi 2 G^2}$ | −0.020 |
| Condition (17) | $\dfrac{\phi 2 GM}{\phi 2 GS}$ | −0.297 |
| Condition (18) | $\dfrac{R_{22} + R_{21}}{R_{22} - R_{21}}$ | 2.831 |

| | Condition (14) | | Condition (19) | |
|---|---|---|---|---|
| | $\dfrac{\nu_d(H) - \nu_d(0)}{\nu_d(0)}$ | | $\dfrac{\phi_a - \phi_{0a}}{\phi 2}$ | |
| | | (r3) | | (r4) |
| 0.0 H max | 0.000 | 0.000 | | −0.000 |
| 0.1 H max | −0.001 | −0.002 | | −0.022 |
| 0.2 H max | −0.005 | −0.008 | | −0.090 |
| 0.3 H max | −0.012 | −0.016 | | −0.209 |
| 0.4 H max | −0.021 | −0.023 | | −0.385 |
| 0.5 H max | −0.033 | −0.023 | | −0.618 |
| 0.6 H max | −0.047 | −0.007 | | −0.896 |
| 0.7 H max | −0.065 | 0.038 | | −1.194 |
| 0.8 H max | −0.086 | 0.124 | | −1.484 |
| 0.9 H max | −0.111 | 0.257 | | −1.776 |
| 1.0 H max | −0.140 | 0.424 | | −2.177 |

| | Condition (19) | |
|---|---|---|
| | $\dfrac{\phi_a - \phi_{0a}}{\phi 2}$ | |
| | (r5) | (r6) |
| 0.0 H max | 0.000 | 0.000 |
| 0.1 H max | −0.109 | 0.000 |
| 0.2 H max | −0.073 | −0.001 |
| 0.3 H max | −0.153 | −0.002 |
| 0.4 H max | −0.245 | −0.002 |
| 0.5 H max | −0.340 | −0.004 |
| 0.6 H max | −0.443 | −0.007 |
| 0.7 H max | −0.604 | 0.000 |
| 0.8 H max | −0.961 | 0.045 |
| 0.9 H max | −1.773 | 0.178 |
| 1.0 H max | −3.315 | 0.432 |

What is claimed is:

1. A zoom lens system comprising, from the object side:
a first lens unit having negative refractive power, said first lens unit being provided at a most object side of the zoom lens unit; and
a second lens unit having positive refractive power;

wherein said zoom lens system varies magnification by changing a distance between at least said first and second lens units, wherein at least one of said lens units includes a gradient index lens expressed by the following equation:

$$N(H) = N_0 + N_1 \cdot H^2 + N_2 \cdot H^4 + N_3 \cdot H^6 \ldots$$

where,

H: height in the direction perpendicular to the optical axis;

$N_0$: refractive index along the optical axis; and $N_i$ (i=1, 2, 3 . . . ): 2ith refractive index distribution coefficient;

said gradient index lens having at least one aspherical surface which has a refractive power.

2. A zoom lens system as claimed in claim 1, wherein said first lens unit comprises a single lens element.

3. A zoom lens system as claimed in claim 1, wherein said second lens unit comprises a single lens element.

4. A zoom lens system as claimed in claim 1, wherein the following condition is fulfilled:

$$-5.0 < \text{sgn}(\phi G) \cdot \frac{N_1}{\phi G^2} < 10.0$$

where, sgn($\phi$G): parameter whose value becomes +1 when the refractive power of the lens unit including a GRIN lens is negative, and −1 when the refractive power of the lens unit including a GRIN lens is positive;

$N_1$: secondary refractive index distribution coefficient of the gradient index lens; and $\phi$G: refractive power of the gradient index lens.

5. A zoom lens system as claimed in claim 1, wherein said second lens unit includes the gradient index lens and the following condition is fulfilled:

$$-10.0 < \frac{N_1 d2}{\phi_2^2} < 5.0$$

where, $N_1 d2$: secondary refractive index distribution coefficient of the GRIN lens used in the second lens unit relative to the d-line; and $\phi_2$: refractive power of the second lens unit.

6. A zoom lens system as claimed in claim 1, wherein said first lens unit includes the gradient index lens and the following conditions are fulfilled:

in a range defined by 0<H<0.5 H max:

$$\frac{d}{dH}\{v_d(H)\} < 0.0$$

in a range defined by 0<H<H max:

$$0.0 < \frac{v_d(H) - v_d(0)}{v_d(0)} \leq 2.0$$

where,

H: height in the direction perpendicular to the optical axis;

H max : maximum value for height in the direction perpendicular to the optical axis;

d/dH: differential symbol; and $v_d(H)$: dispersion of the gradient index lens at a point that is height H away from the optical axis, in the direction perpendicular to the optical axis.

7. A zoom lens system as claimed in claim 1, wherein said first lens unit includes the gradient index lens and the following condition is fulfilled:

$$-0.3 < \frac{N_1 \lambda 1 - N_1 d1}{\phi 1 G^2} < 0.2$$

where, $N_1 d1$: secondary refractive index distribution coefficient of the gradient index lens used in the first lens unit relative to the d-line;

$N_1 \lambda 1$: secondary refractive index distribution coefficient of the gradient index lens used in the first lens unit relative to the C-line or the F-line; and, $\phi 1G$: refractive power of the gradient index lens used in the first lens unit.

8. A zoom lens system as claimed in claim 1, wherein said first lens unit includes the gradient index lens and the following condition is fulfilled:

$$-2.0 < \frac{N_1 d1}{\phi 1 G^2} < 5.0$$

where, $N_1 d1$: secondary refractive index distribution coefficient of the GRIN lens used in the first lens unit relative to the d-line; and, $\phi 1G$: refractive power of the GRIN lens used in the first lens unit.

9. A zoom lens system as claimed in claim 1, wherein said first lens unit includes the gradient index lens and the following condition is fulfilled:

$$\left| \frac{N_2 d1}{1 \phi G^4} \right| < 100$$

where, $N_2 d1$: quaternary refractive index distribution coefficient of the GRIN lens used in the first lens unit relative to the d-line; and, $\phi 1G$: refractive power of the GRIN lens used in the first lens unit.

10. A zoom lens system as claimed in claim 1, wherein said first lens unit includes the gradient index lens and the following condition is fulfilled:

$$-0.2 < \frac{\phi 1GM}{\phi 1GS} < 0.5$$

where, $\phi 1GS$: refractive power of the surface of the GRIN lens used in the first lens unit; and $\phi 2GM$: refractive power of the medium of the GRIN lens used in the first lens unit.

11. A zoom lens system as claimed in claimed 1, wherein said first lens unit comprises the single gradient index lens having at least one aspherical surface, and said single gradient index lens comprises either a negative lens with a strongly curved concave surface on the image side or a negative meniscus lens with the convex surface on the object side.

12. A zoom lens system as claimed in claim 1, wherein said first lens unit includes the gradient index lens and the following condition is fulfilled:

$$-5.0 < \frac{R_{12} + R_{11}}{R_{12} - R_{11}} < 0.0$$

where, $R_{11}$: radius of curvature of the object side surface of the first lens unit; and $R_{12}$: radius of curvature of the image side surface of the first lens unit.

13. A zoom lens system as claimed in claim 1, wherein said first lens unit includes the gradient index lens and the following condition is fulfilled:

in a range defined by 0<H<H max:

$$-6.0 < \frac{\phi_a - \phi_{0a}}{\phi_1} < 5.0$$

where, $\phi_a$: local refractive power of the aspherical surface;

$\phi_{0a}$: refractive power based on the reference curvature of the aspherical surface; and $\phi_1$: refractive power of the first lens unit.

14. A zoom lens system as claimed in claim 1, wherein said second lens unit includes the gradient index lens and the following conditions are fulfilled:

in a range defined by 0<H<0.5 H max:

$$\frac{d}{dH}\{v_d(H)\} < 0.0$$

in a range defined by 0<H<H max:

$$-1.0 < \frac{v_d(H) - v_d(0)}{v_d(0)} \leq 0.0$$

where,

H: height in the direction perpendicular to the optical axis;

H max: maximum value for height in the direction perpendicular to the optical axis;

c/dH: differential symbol; and $v_d(H)$: dispersion of the gradient index lens at a point that is height H away from the optical axis, in the direction perpendicular to the optical axis.

15. A zoom lens system as claimed in claim 1, wherein said second lens unit includes the gradient index lens and the following condition is fulfilled:

$$-0.1 < \frac{N_1\lambda 2 - N_1 d2}{\phi 2 G^2} \leq 0.1$$

where, $N_1 d2$: secondary refractive index distribution coefficient of the gradient index lens used in the second lens unit relative to the d-line;

$N_1\lambda 2$: secondary refractive index distribution coefficient of the gradient index lens used in the second lens unit relative to the C-line and the F-line; and, $\phi 2G$: refractive power of the gradient index lens used in the second lens unit.

16. A zoom lens system as claimed in claim 1, wherein said second lens unit includes the gradient index lens and the following condition is fulfilled:

$$\left|\frac{N_2 d2}{\phi 2 G^4}\right| < 100$$

where, $N_2 d2$: quaternary refractive index distribution coefficient of the gradient lens used in the second lens unit relative to the d-line; and $\phi 2G$: refractive power of the gradient index lens used in the second lens unit.

17. A zoom lens system as claimed in claim 1, wherein said second lens unit includes the gradient index lens and the following condition is fulfilled:

$$-0.5 < \frac{\phi 2GM}{\phi 2GS} < 1.0$$

where, $\phi 2GS$: refractive power of the surface of the gradient index lens used in the second lens unit; and $\phi 2GM$: refractive power of the medium of the gradient index lens used in the second lens unit.

18. A zoom lens system as claimed in claim 1, wherein said second lens unit includes the gradient index lens and the following condition is fulfilled:

$$0.0 < \frac{R_{22} + R_{21}}{R_{22} - R_{21}} < 10.0$$

where, $R_{21}$: radius of curvature of the object side surface of the second lens unit; and $R_{22}$: radius of curvature of the image side surface of the second lens unit.

19. A zoom lens system as claimed in claim 1, wherein said second lens unit comprises the single gradient index lens having at least one aspherical surface, said single gradient index lens comprises either a positive lens with a strongly curved convex surface on the object side or a positive meniscus lens with the convex surface on the object side.

20. A zoom lens system as claimed in claim 1, wherein said second lens unit includes the gradient index lens and the following condition is fulfilled:

in a range defined by 0<H<H max:

$$-6.0 < \frac{\phi_a - \phi_{0a}}{\phi_2} < 5.0$$

where, $\phi_a$: local refractive power of the aspherical surface;

$\phi_{0a}$: refractive power based on the reference curvature of the aspherical surface; and $\phi_2$: refractive power of the second lens unit.

21. A zoom lens system as claimed in claim 1, wherein the following condition is fulfilled:

$$0.3 < \left|\frac{\phi_1}{\phi_2}\right| < 1.0$$

where, $\phi_1$: refractive power of the first lens unit; and $\phi_2$: refractive power of the second lens unit.

22. A zoom lens system comprising, from the object side:

a first lens unit having negative refractive power, said first lens unit comprising a single gradient index lens having at least one aspherical surface, said first lens unit being provided at a most object side of the zoom lens unit; and a second lens unit having positive refractive power, wherein said zoom lens system varies magnification by changing a distance between at least said first and second lens units, wherein said single gradient index lens has a refractive index distribution expressed by the following equation:

$$N(H) = N_0 + N_1 \cdot H^2 + N_2 \cdot H^4 + N_3 \cdot H^6 \ldots$$

where,

H: height in the direction perpendicular to the optical axis;

$N_0$: refractive index along the optical axis; and $N_i$ (i=1, 2, 3 . . . ): 2ith refractive index distribution coefficient.

23. A zoom lens system as claimed in claim 22, wherein said gradient index lens has aspherical surfaces on both the object and image sides.

24. A zoom lens system comprising, from the object side:

a first lens unit having negative refractive power, said first lens unit being provided at a most object side of the zoom lens unit; and a second lens unit having positive refractive power, said second lens unit comprising a single gradient index lens having at least one aspherical surface, wherein said zoom lens system varies magnification by changing a distance between at least said first and second lens units, wherein said single gradient index lens has a refractive index distribution expressed by the following equation:

$$N(H) = N_0 + N_1 \cdot H^2 + N_2 \cdot H^4 + N_3 \cdot H^6 \ldots$$

where,

H: height in the direction perpendicular to the optical axis;

$N_0$: refractive index along the optical axis; and $N_i$ (i=1, 2, 3 . . . ): 2ith refractive index distribution coefficient.

25. A zoom lens system as claimed in claim 24, wherein said gradient index lens has aspherical surfaces on both the object and image sides.

26. A zoom lens system comprising, from the object side:

a first lens unit having negative refractive power, said first lens unit comprising a single gradient index lens having at least one aspherical surface, said first lens unit being provided at a most object side of the zoom lens unit; and a second lens unit having positive refractive power, said second lens unit comprising a single gradient index lens having an optical power and at least one aspherical surface, wherein said zoom lens system varies magnification by changing a distance between at least said first and second lens units, wherein said single gradient index lenses have refractive index distributions expressed by the following equation:

$$N(H) = N_0 + N_1 \cdot H^2 + N_2 \cdot H^4 + N_3 \cdot H^6 \ldots$$

where,

H: height in the direction perpendicular to the optical axis;

$N_0$: refractive index along the optical axis; and $N_i$ (i=1, 2, 3 . . . ): 2ith refractive index distribution coefficient.

27. A zoom lens system comprising, from the object side:

a first lens unit having positive refractive power, said first lens unit consisting of a single gradient index lens provided at least one aspherical surface;

a second lens unit having negative refractive power; and a third lens unit, wherein said zoom lens system varies magnification by changing a distance between at least said first and second lens unit, wherein said single gradient index lens has a refractive index distribution expressing by means of following equation:

$$N(H) = N_0 + N_1 \cdot H^2 + N_2 \cdot H^4 + N_3 \cdot H^6 \ldots$$

where,

H: height in the direction perpendicular to the optical axis;

$N_0$: refractive index along the optical axis; and $N_i$ (i=1, 2, 3 . . . ): 2ith refractive index distribution coefficient.

28. A zoom lens system as claimed in claim 27, wherein said gradient index lens has aspherical surfaces on both the object and image sides.

29. A zoom lens system comprising, from the object side:

a first lens unit having positive refractive power;

a second lens unit having negative refractive power, said second lens unit consisting of a single gradient index lens provided at least one aspherical surface; and a third lens unit, wherein said zoom lens system varies magnification by changing a distance between at least said first and second lens unit, wherein said single gradient index lens has a refractive index distribution expressing by means of following equation:

$$N(H) = N_0 + N_1 \cdot H^2 + N_2 \cdot H^4 + N_3 \cdot H^6 \ldots$$

where,

H: height in the direction perpendicular to the optical axis;

$N_0$: refractive index along the optical axis; and $N_i$ (i=1, 2, 3 . . . ): 2ith refractive index distribution coefficient.

30. A zoom lens system as claimed in claim 29, wherein said gradient index lens has aspherical surfaces on both the object and image sides.

31. A zoom lens system comprising, from the object side:

a first lens unit having negative refractive power, said first lens unit consisting of a single gradient index lens provided at least one aspherical surface;

a second lens unit having negative refractive power, said second lens unit consisting of a single gradient index lens provided at least one aspherical surface; and a third lens unit, wherein said zoom lens system varies magnification by changing a distance between at least said first and second lens unit, wherein said single gradient index lenses have refractive index distributions expressing by means of following equation:

$$N(H)=N_0+N_1 \cdot H^2+N_2 \cdot H^4+N_3 \cdot H^6 \ldots$$

where,

H: height in the direction perpendicular to the optical axis;

$N_0$: refractive index along the optical axis; and $N_i$ (i=1, 2, 3 . . . ): 2ith refractive index distribution coefficient.

32. A zoom lens system for forming an image of an object on a solid state imaging device, comprising, from the object side:

a first lens unit having negative refractive power, said first lens unit being provided at a most object side of the zoom lens system:

a second lens unit having positive refractive power; and a filter provided between said second lens unit and an image plane, wherein said zoom lens system varies magnification by changing a distance between at least said first lens unit and said second lens unit, wherein at least one of said lens units includes a gradient index lens having a refractive index distribution expressed by the following equation:

$$N(H)=N_0+N_1 \cdot H^2+N_2 \cdot H^4+N_3 \cdot H^6 \ldots$$

where,

H: height in the direction perpendicular to the optical axis;

$N_0$: refractive index along the optical axis; and $N_i$: 2ith refractive index distribution coefficient, said gradient index lens having at least one aspherical surface which has a refractive power.

33. A zoom lens system for forming an image of an object on a solid state imaging device, comprising, from the object side:

a first lens unit having negative refractive power, said first lens unit comprising a single gradient index lens having at least one aspherical surface, said first lens unit being provided at a most object side of the zoom lens system;

a second lens unit having positive refractive power; and a filter provided between said second lens unit and an image plane, wherein said zoom lens system varies magnification by changing a distance between at least said first lens unit and said second lens unit, wherein said single index lens has a refractive index distribution expressed by the following equation:

$$N(H)=N_0+N_1 \cdot H^2+N_2 \cdot H^4+N_3 \cdot H^6 \ldots$$

where,

H: height in the direction perpendicular to the optical axis;

$N_0$: refractive index along the optical axis; and $N_i$: 2ith refractive index distribution coefficient.

34. A zoom lens system for forming an image of an object on a solid state imaging device, comprising, from the object side:

a first lens unit having negative refractive power, said first lens unit being provided at a most object side of the zoom lens system;

a second lens unit having positive refractive power, said second lens unit comprising a single gradient index lens having at least one aspherical surface; and a filter provided between said second lens unit and an image plane, wherein said zoom lens system varies magnification by changing a distance between at least said first lens unit and said second lens unit, wherein said single index lens has a refractive index distribution expressed by the following equation:

$$N(H)=N_0+N_1 \cdot H^2+N_2 \cdot H^4+N_3 \cdot H^6 \ldots$$

where,

H: height in the direction perpendicular to the optical axis;

$N_0$: refractive index along the optical axis; and $N_i$: 2ith refractive index distribution coefficient.

35. A zoom lens system for forming an image of an object on a solid state imaging device, comprising, from the object side:

a first lens unit having negative refractive power, said first lens unit comprising a single gradient index lens having at least one aspherical surface, said first lens unit being provided at a most object side of the zoom lens system;

a second lens unit having a positive refractive power, said second lens unit comprising a single gradient index lens having at least one aspherical surface; and a filter provided between said second lens unit and an image plane, wherein said zoom lens system varies magnification by changing a distance between at least said first lens unit and said second lens unit, wherein said single gradient index lenses have refractive index distributions expressed by the following equation:

$$N(H)=N_0+N_1 \cdot H^2+N_2 \cdot H^4+N_3 \cdot H^6 \ldots$$

where,

H: height in the direction perpendicular to the optical axis;

$N_0$: refractive index along the optical axis; and $N_i$: 2ith refractive index distribution coefficient.

* * * * *

UNITED STATES PATENT AND TRADEMARK OFFICE
CERTIFICATE OF CORRECTION

PATENT NO : 5,978,154
DATED : November 2, 1999
INVENTOR(S): Junji HASHIMURA

It is certified that error appears in the above-identified patent and that said Letters Patent is hereby corrected as shown below:

On the Title Page [75], Inventor: after "Jinji Hashimura," delete "Sakai" and insert --Sakai-Shi--.

Column 24, claim 10, line 63, delete "Ø2GM" and insert --Ø1GM--.

Column 25, claim 14, line 49, delete "c/dH:" and insert --d/dh:--.

Column 30, claim 35, line 56, delete "the" and insert --an--.

Signed and Sealed this

Twenty-seventh Day of March, 2001

Attest:

NICHOLAS P. GODICI

Attesting Officer

Acting Director of the United States Patent and Trademark Office